United States Patent [19]

Davis

[11] Patent Number: 5,269,461
[45] Date of Patent: Dec. 14, 1993

[54] AEROSOL NOZZLE SYSTEM

[76] Inventor: James F. Davis, 2105 Palmbrooke Ct., Lexington, Ky. 40513

[21] Appl. No.: 850,768

[22] Filed: Mar. 13, 1992

[51] Int. Cl.$^5$ .......................... B05B 1/28; B05B 15/06
[52] U.S. Cl. ..................................... 239/77; 239/291; 239/419.5; 239/434; 406/102
[58] Field of Search ................... 239/8, 434, 419.5, 77, 239/78, 291, DIG. 21, DIG. 22; 406/100, 102

[56] References Cited

U.S. PATENT DOCUMENTS

| | | | |
|---|---|---|---|
| 2,291,871 | 8/1942 | Bokum et al. | 406/102 |
| 2,381,762 | 8/1945 | McConkle | 406/100 |
| 2,661,239 | 12/1953 | Tirrell | 239/77 |
| 2,668,082 | 2/1954 | Pasteur | 239/77 |
| 2,738,226 | 3/1956 | Bals | 239/77 |
| 3,069,091 | 12/1962 | Giesse et al. | 239/434 |
| 3,301,485 | 1/1967 | Tropeano et al. | 239/14.2 |
| 3,369,754 | 2/1968 | Wolford | 239/78 |
| 3,724,762 | 4/1973 | Freshour et al. | 239/419.5 |
| 3,883,073 | 5/1975 | Ballu | 239/77 |
| 4,573,636 | 3/1986 | Dilworth et al. | 239/294 |
| 4,821,495 | 4/1989 | De Buhr et al. | 406/100 |

FOREIGN PATENT DOCUMENTS 625890 3/1958 Canada ................ 406/102

OTHER PUBLICATIONS

"Mist Sprayers–Row Crops, Vegetables, Foliar Fertilizer, Orchards and Trees", Automatic Equip. Mfg. Co., pp. 1–15 (plus front and back covers).
"Jacto (Super Jatao 600) Total Protection For Your Crops", Agrotec, (2 pages).
"Leco–Model 1600–Ultra Low Volume (ULV) Cold Aerosol Insecticide Generator", Lowndes Engineering Company, Inc. (2 pages).
"Micro–Gen Equipment Corp.–For Quality Equipment and Chemicals" (4 pages).
"Buffalo Turbine–Turbulent Air Spray-Duster Model-CS", Buffalo Turbine, Agricultural Equipment Co., Inc. (2 pages).
"M.F.P. vs U.L.V.–Presenting The New General Of Super Nozzles And Systems", Vapex Systems, Inc. (1 page).

Primary Examiner—Andres Kashnikow
Assistant Examiner—Christopher G. Trainor
Attorney, Agent, or Firm—Frost & Jacobs

[57] ABSTRACT

A nozzle assembly for dispensing and transporting an application media in an airstream to a remote target area surrounds primary airstream with a protective concentric sleeve of air. The assembly introduces atomized droplets of a concentrated application media radially inwardly into the airstream through the airstream's peripheral boundaries to further atomize the droplets.

15 Claims, 5 Drawing Sheets

AEROSOL NOZZLE SYSTEM

TECHNICAL FIELD

The invention relates generally to the field of aerosol mist sprayers for suspending and transporting liquid and solid particles of an application media, such as an insecticide, and more particularly concerns a nozzle system for projecting a gaseous suspension of an application media in a controlled airstream over substantial distances. The invention will be specifically disclosed in connection with a small portable nozzle system for accurately delivering either or both ultra low volume liquid droplets of insecticide, that is insecticide droplets having a diameter in the order of 60 microns or less, and granular particles for distances in excess of 100 feet.

BACKGROUND OF THE INVENTION

Most conventional aerosol nozzle systems used for delivering and dispensing application media, such as insecticides, fertilizers and other chemical sprays, generate spray mists of liquid media droplets having sizes in the order of 100 to 500 microns, the sizes being measured across the diameters of the droplets. These conventional systems have dispensed application media in a variety of different ways, from localized misting systems in which the application media is dispensed as a mist directly into the ambient air to fall by gravity on a selected target area, to airstream transport systems where the mist is injected into an airstream, and the airstream is used to transport the application media to a more remote target location.

There are a number of different ways that prior art airstream type systems have introduced liquid droplets into an airstream. In one airstream type of sprayer used commercially in agricultural applications, for example, a number of liquid dispensing nozzles, usually four or six nozzles, are placed in equally spaced locations about the internal diameter of a high velocity airstream nozzle and arranged to extend radially inwardly into the airstream nozzle for dispensing application media droplets into the central portion of the airstream.

In recent years, it has been realized that droplets in the 100 to 500 micron size range have a number of disadvantages. Among other disadvantages, droplets of this magnitude of size have considerable weight, and for this reason, such droplets tend to fall to the ground when it is attempted to propel the droplets in an airstream generated by conventional spray delivery systems. Consequently, it is difficult to deliver droplets of this size to locations that are removed from the spray nozzle by substantial distances. Moreover, it has been discovered that, for contact insecticides that kill insects upon impingement, droplets in the 100 to 500 micron range provide substantial overkill, and consequently, the use of droplets of this size results in an inefficient and wasteful use of the insecticide.

In order to partially alleviate the disadvantageous consequences that flow from the use of such large droplets, spray nozzles have been developed that produce droplets having a size in the order of 1 to 60 microns. Liquid droplets in this size range are generally referred to in the industry as ultra low volume (ULV) droplets. Studies have shown that ULV droplet sizes are optionally sized for killing many types of insects with direct impingement insecticides, and droplets of insecticides in this size range are more effective in killing insects with substantially smaller amounts of insecticide. Further, these smaller droplet sizes can be carried more easily over substantially longer distances in an airstream than can droplet sizes in the 100 to 500 micron size range. Additionally, the use of such smaller droplets permits the dispensing of the application media in concentrated, undiluted form. Among other advantages, the dispensing of such chemicals in concentrated form eliminates the need to carry the additional volume and weight of water or other mixing media on the vehicle transporting the aerosol system. It further eliminates the need to expend the considerable energy required for dispensing water over long distances. Unfortunately, most conventional liquid dispensing nozzles cannot produce liquid droplets in the ULV size range.

Among other methods of producing and dispensing the small liquid droplets of application media, one commercially available nozzle system for dispensing droplets in the 60 micron size range has been designed to discharge droplets of chemical insecticide from a liquid nozzle located in the center of a high velocity airstream at the outlet of an airstream nozzle, and to use the airstream to carry the droplets of insecticide over substantial areas of farm fields to kill insects that are harmful to crops. In this system, a spray of chemical is metered at low pressure into a spinning rotating sleeve which delivers a narrow spectrum of droplets into a turbulent airstream. The outside of the cylinder has a series of radially outwardly extending blades, the pitch of which blades control the speed of the cylinder rotation. The rotational speed of the cylinder, in turn, controls the droplet size of the droplet dispensed into an airstream. The airstream, which is created by a centrifugal fan, then carries the droplets to a distal location. These and other types of insecticide dispensing systems have achieved some measure of success. Nevertheless, the chemical spraying and dusting machines of the prior art have been unable to apply insecticides effectively in many situations. Indeed, many situations place mutually contradictory requirements upon the dispensing systems. For example, it is often necessary to spray insecticides from portable misters transported on the bed of a small, light truck, and to penetrate through thick foliage with the spray. The need to penetrate the foliage precipitates the need to dispense the insecticide in an airstream having substantial velocity and airflow, a need that is usually fulfilled by using larger, heaver blowers. However, at the same time, it is often necessary to transport the insecticide dispensing system economically in lightweight vehicles to locations that are inaccessible to larger vehicles, and the size, space and expense of larger blowers is often prohibitive. Also, it is often necessary to apply insecticide in locations that are some distance from roadways, or other areas that are inaccessible to the spraying and dusting machines, even when they are mounted on small, mobile, lightweight trucks.

Dispensing the insecticide in small droplets reduces the weight of the droplets and makes it easier to carry the droplets over long distances. However, the light weight of these small droplets makes the airstream transport of the droplets highly susceptible to interference by the wind, and it is difficult, sometimes impossible, during even light wind conditions, to accurately transport the small, optionally sized droplets of application media in an airstream created by conventional insecticide dispensing systems. Consequently, if the insecticide or other application media is to be accurately applied in less than perfect weather conditions, it is necessary to protect the chemical spray against wind interference. However, most prior art aerosol sprayers and dusters, which have not been able to adequately control and target the application of insecticides or other application media sprays over long distances under even ideal conditions, are virtually inoperable under any wind conditions.

SUMMARY OF THE INVENTION

Accordingly, it is an object of the invention to provide an aerosol nozzle dispensing system for a portable, lightweight aerosol nozzle system that dispenses an application media in a gaseous suspension and accurately transports the media suspension in an airstream to a target area over substantial distances.

It is another object of the invention to provide an aerosol nozzle system for isolating a gaseous suspension that is being transported over substantial distances in an airstream from the ambient air disturbances.

Another object of the invention is to provide an aerosol nozzle system for introducing droplets of a liquid into a controlled area of high turbulence in a gaseous airstream so as to simultaneously break the droplets into smaller droplets and to accurately transport the smaller droplets to a distal target area in a protected curtain of less turbulent flow.

Still another object of the invention is to provide an aerosol nozzle capable of dispensing both granular particles and liquid ultra low volume droplets.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved aerosol nozzle assembly is provided for transporting a gaseous suspension of an application media in an airstream. The system includes a base, and an airstream nozzle supported relative to the base. The system has means for producing and directing a primary airstream of high velocity air into the airstream nozzle, which primary airstream discharges from a discharge exit. A liquid atomizing nozzle assembly is positioned in proximity to the airstream nozzle discharge exit for dispensing atomized droplets of a liquid application media into the primary stream of high velocity air. The liquid nozzle assembly includes at least one liquid atomizing nozzle having a discharge orifice located axially downstream of and radially spaced from the airstream nozzle exit. The liquid atomizing nozzle is positioned to introduce atomized liquid droplets of the application media radially inwardly into the Primary airstream through the primary airstream's peripheral boundaries. Means are also provided for introducing a controlled secondary airstream about the periphery of the primary airstream in the radial space between the liquid nozzle and the peripheral boundaries of the primary airstream.

In accordance with another aspect of the invention, the aerosol nozzle assembly includes a plurality of liquid spray nozzles located axially downstream of and radially spaced from the airstream nozzle exit for introduce atomized liquid droplets of the application media radially inwardly into the primary airstream through the primary airstream's peripheral boundaries.

According to another aspect of the invention, the plurality of liquid nozzles are substantially equally spaced about the periphery of the primary airstream.

In another aspect of the invention, the secondary airstream introducing means includes a plurality of orifices in the liquid atomizing assembly that are arranged in concentric relationship to the airstream nozzle.

According to a still further aspect of the invention, the liquid atomizing nozzle introduces atomized droplets of an application media radially inwardly into the primary airstream in a direction generally perpendicular to the axis of the primary airstream.

In another aspect of the invention, the airstream nozzle is tapered in the direction of the primary airstream flow.

In one specific aspect of the invention, the airstream nozzle is adjustably curved.

In another aspect of the invention, the airstream nozzle has a substantially constant cross-sectional area in the section immediately upstream of the discharge exit.

In a still further aspect of the invention, the nozzle system can be used to transport solid granular particles in the primary airstream.

In yet another aspect of the invention, the producing and directing means includes a centrifugal fan with flat material handling blades.

In yet another aspect of the invention, the various atomizing nozzles introduce different application medias into the primary airstream atomizing nozzles and the nozzle system simultaneously dispenses a plurality of application medias.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawing and descriptions will be regarded as illustrative in nature and not as restrictive.

BRIEF DESCRIPTION OF THE DRAWINGS

The accompanying drawing incorporated in and forming a part of the specification illustrates several aspects of the present invention, and together with the description serve to explain the principles of the invention. In the drawings.

Reference will now be made in detail to the present preferred embodiment of the invention, an example of which is illustrated in the accompanying drawing, wherein like numerals indicate the same elements throughout the views.

DETAILED DESCRIPTION OF THE PREFERRED EMBODIMENT

Figure 1:
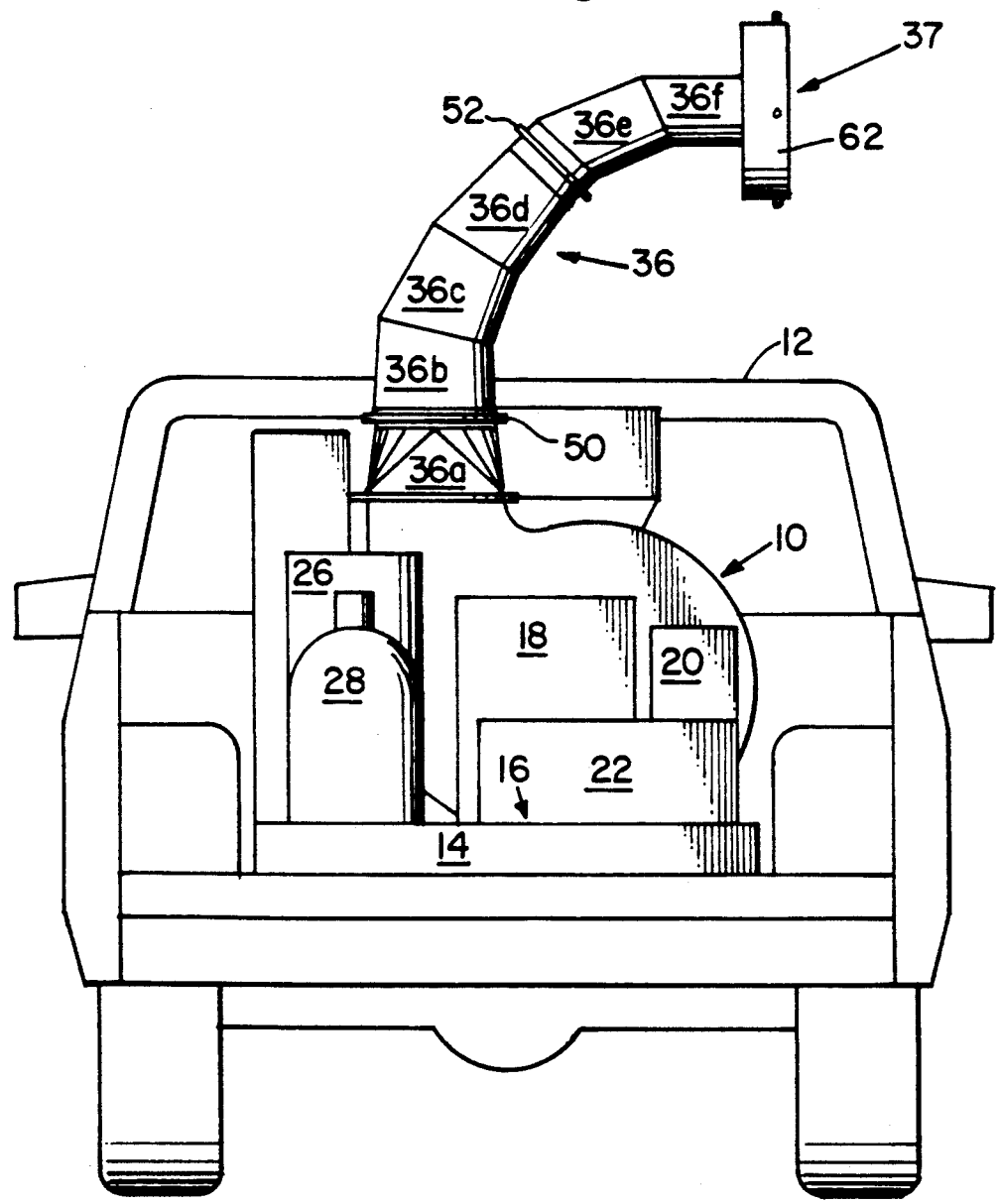
FIG. 1 is a schematic rear elevational view of a pickup truck transporting a aerosol nozzle system constructed in accordance with the principles of the present invention.

Referring now to the drawings, FIG. 1 depicts an aerosol nozzle system constructed in accordance with the principles of the present invention, generally depicted by the numeral 10 in the drawings, being transported in the bed of a application vehicle, specifically shown as a pick-up truck 12. The specific nozzle system illustrated is designed to transport a gaseous suspension of an application media, such as an insecticide, to a remote location in a high velocity airstream. As will be explained below, the nozzle system 10 of the preferred embodiment is capable of transporting an application media in either solid particulate or liquid droplet form. The nozzle system 10 of the invention can be used particularly advantageously in the dispensing of ultra low volume (ULV) liquid particles of insecticide, that is liquid insecticide droplets having an average diameter in the 1 to 60 micron range.

The nozzle system 10 includes a rectangular base 14 formed of a series of interconnected rectangular channels, which channels support a base surface 16.

Figure 2:
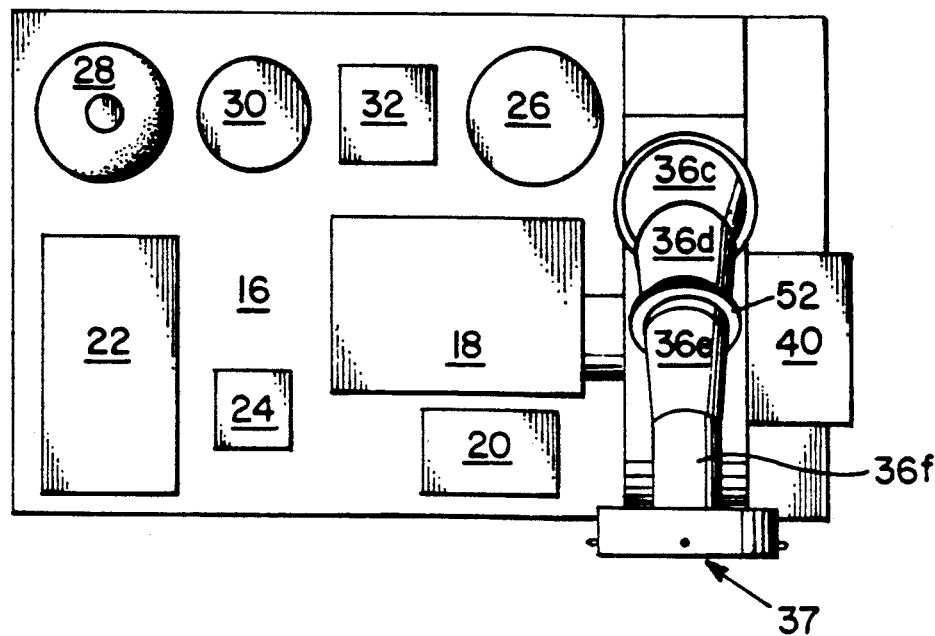
FIG. 2 is a top plan schematic view of the aerosol nozzle system of FIG. 1.
Figure 3:
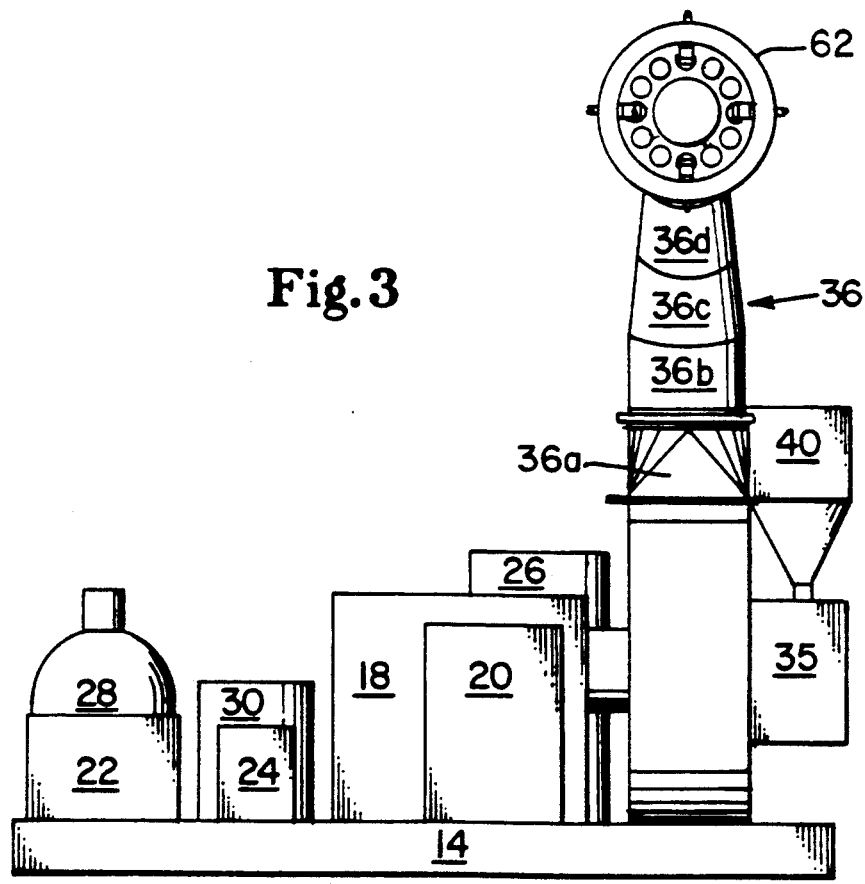
FIG. 3 is a schematic side elevational view showing a first side of the aerosol nozzle system of FIG. 1.
Figure 4:
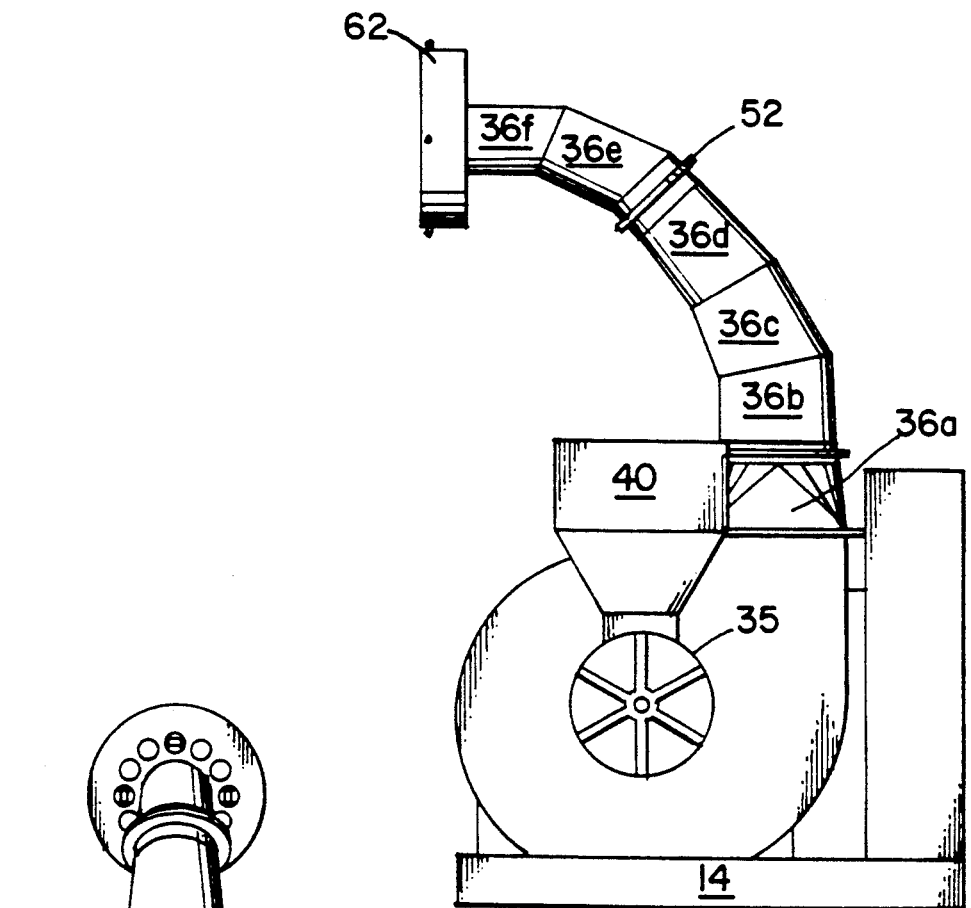
FIG. 4 is an schematic end elevational view of the aerosol nozzle assembly of FIG. 1.
Figure 5:
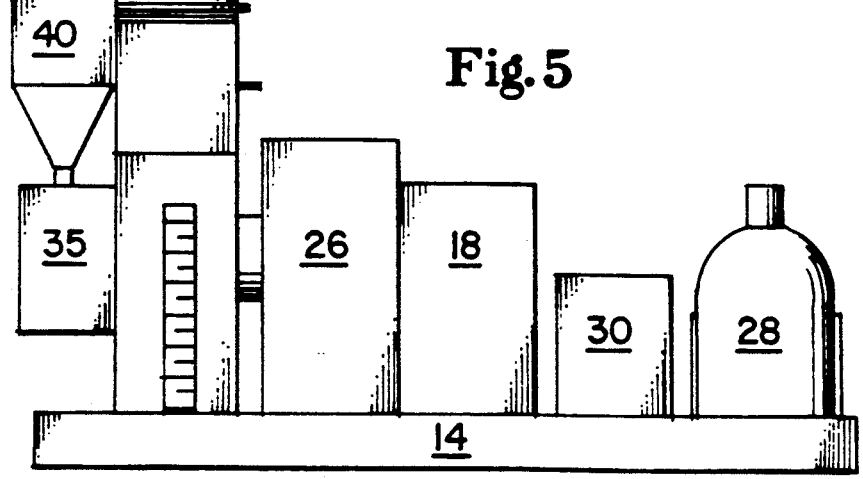
FIG. 5 is a schematic side elevational view showing a second side of the aerosol nozzle assembly of FIG. 1.

The base surface 16 is, in turn, used to support a self-contained nozzle system, including a gasoline engine 18, a compressor 20, a fuel tank 22, and a battery 24 (See FIG. 2). The base surface is also used to support nozzle system accessories, such as mix and flush tanks 26 and 28 respectively, and application media tanks, such as container 30 for an insecticide such as Malathion, and container 32 for another application media, such as a chemical larvacide. In addition to the liquid application medias stored in containers 30 and 32, the nozzle system 10 may be used to dispense solid application medias. It may be observed from FIGS. 2-5 that the a solid particle bin 40 is located adjacent to a centrifugal blower 35. This bin 40 is used to store solid application media, such as solid insecticide powers, and to deliver this type of solid media directly into the centrifugal blower 35.

As those skilled in the art will readily appreciate, the nozzle system 10 generates an airstream of high velocity air. In the preferred form of the invention, the high velocity airstream, referred to herein as the primary airstream, is approximately 18,500 feet per minute. This primary airstream is generated by the blower 35, which in the illustrated form of the invention is a Class III centrifugal fan. Unlike most conventional blowers, the blower 35 has a plurality of flat material handling blades, which, among other advantages, allows the blower to accommodate solids without significant blade damage. The high velocity primary airstream produced by the blower 35 is directed into an airstream nozzle 36, which, as depicted in FIG. 1, is both curved and tapered. The airstream nozzle 36 of the preferred embodiment is gradually tapered from a nine inch diameter at its junction with the blower 35 to a 5.5 inch diameter at its discharge end, which discharge end is not specifically illustrated in FIG. 1 (See FIGS. 6–8), but is generally indicated on the drawing by the numeral 37. However, the section of the airstream nozzle immediately upstream of the discharge exit, section 36f, has a substantially constant cross-sectional area.

In addition to being tapered, the airstream nozzle 36 is gradually and adjustably curved. It is advantageous to curve the airstream nozzle in order to elevate the discharge end 37 to generally horizontal position at a height sufficient to avoid any inadvertent discharge of the application media on a person standing in or along side of the application vehicle, specifically shown as a pick-up truck 12. It is advantageous to make the discharge end 37 adjustable to vary the direction of high velocity airstream. In the form of the invention shown, the airstream nozzle 36 is formed by a series of interconnected sections, sections 36a-36f. Two of the junctions between these various sections, junctions 50 and 52 between sections 36a,36b and 36d,36e respectively, permit rotatable adjustment between adjacent interconnected sections. These two rotatable junctions allow the airstream nozzle 36 to be discharged in any horizontal direction, and throughout an angle range of approximately 90 degrees in the vertical direction. When used in the lightweight, portable pick-up truck mounted form illustrated, these angular adjustments permit the nozzle system 10 to be used to direct the application media at targets in all directions as close as the immediate roadside and at distances of a hundred feet or more.

In accordance with one of the principle advances of the invention, the nozzle system 10 includes a liquid atomizing nozzle assembly, generally designated in the drawings by the numeral 60, for introducing liquid droplets of application media into the primary airstream. This nozzle assembly, specifically depicted in FIGS. 6-8, includes a nozzle support 62. The nozzle support 62 includes a cylindrical hub 64 in spaced concentric relationship about the terminal section 36f of the airstream nozzle 36. The hub 64 is supported at its inboard end by a circular disc 66 attached to and extending radially outwardly from the outer peripheral surface of the terminal airstream section 36f. As best appreciated from jointly viewing FIGS. 6 and 7, the hub 64 is used to support four liquid atomizing nozzles, 67, 68, 70, and 72. These liquid atomizing nozzles are placed circumferentially about the primary airstream discharged from airstream nozzle 36, preferably in a substantially equally spaced arrangement.

Figure 7:
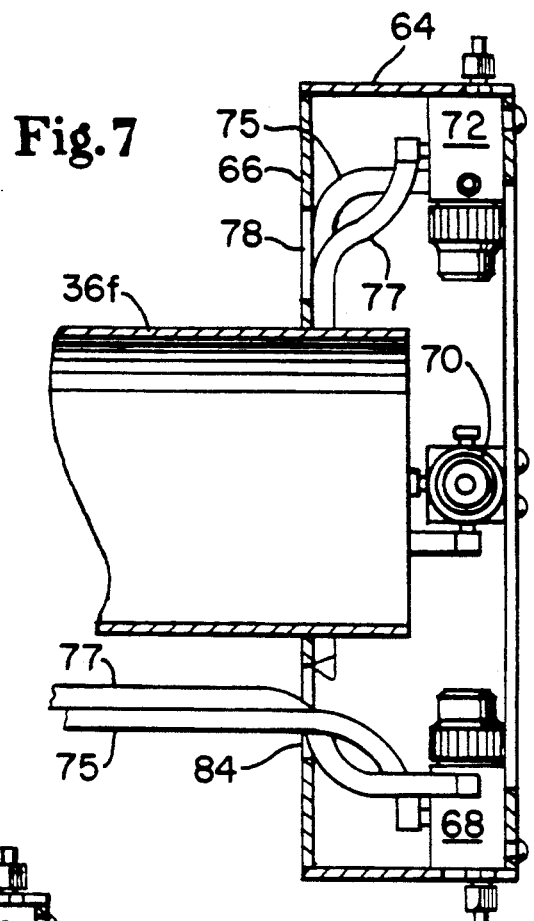
FIG. 7 is a side elevational view taken across the plane 7—7 in FIG. 6 further showing the relationship between the liquid nozzle assembly and the airstream nozzle.
Figure 8:
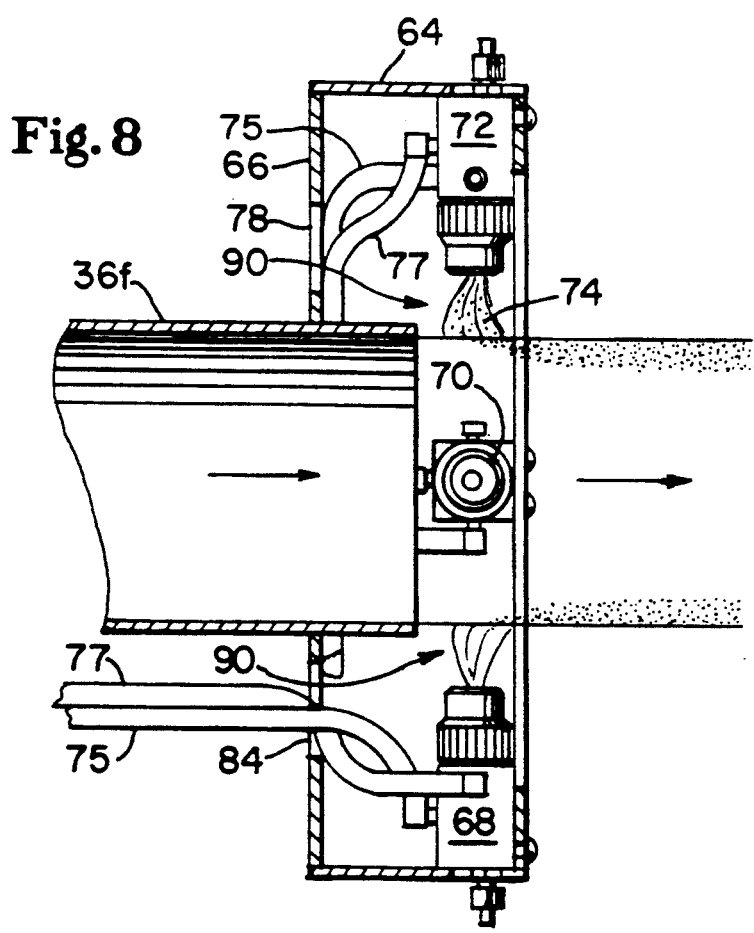
FIG. 8 is a side elevational view similar to view of FIG. 1, but showing liquid droplets being injected into the airstream exiting the airstream nozzle.

From FIG. 7 it will be seen that the liquid atomizing nozzles 67, 68, 70, and 72 are positioned axially downstream of and radially outwardly from the airstream nozzle 36. These nozzles 67, 68, 70 and 72 are aligned so as to introduce a multitude of atomized liquid droplets 74 of application media radially inwardly into the primary airstream through the primary airstream's peripheral boundaries. In the specific embodiment illustrated, the droplets 74 have an average diameter of less than 60 microns and are introduced into the primary airstream from a perpendicular direction. By introducing the atomized liquid droplets into the high velocity primary airstream in this way, the liquid droplets of application media are further atomized, or broken up into droplets of even smaller size. Without being restricted to any particular theory of operation, it is believed that the impact between the droplets 74 and the primary airstream produces the further atomization of the droplets 74, and that introducing the droplets into airstream's peripheral boundaries enhances the process. The enhancement of atomization is believed to result from the complex movement of the droplets in the highly turbulent flow at the primary airstream's peripheral boundaries.

FIG. 7 also depicts liquid application media and compress air, lines 75 and 77 respectively, servicing the atomizing nozzles 67, 68, 70 and 72. The compressed air line 77 is in fluid communication with the compressor 20 shown in FIGS. 1-3. The application media service lines 75 are in fluid communication with one or both of the application media tanks 30 and 32. One advantage of the depicted arrangement is that the application media service line 75 to one of the atomizing nozzles can be connected to a first application media, such as the insecticide in container 30, while another of the application media lines 75 can be connected to a second application media, such as the larvacide in container 32. In this way, two different application medias can be introduced into the primary airstream and dispensed by the nozzle system 10 simultaneously.

Figure 6:
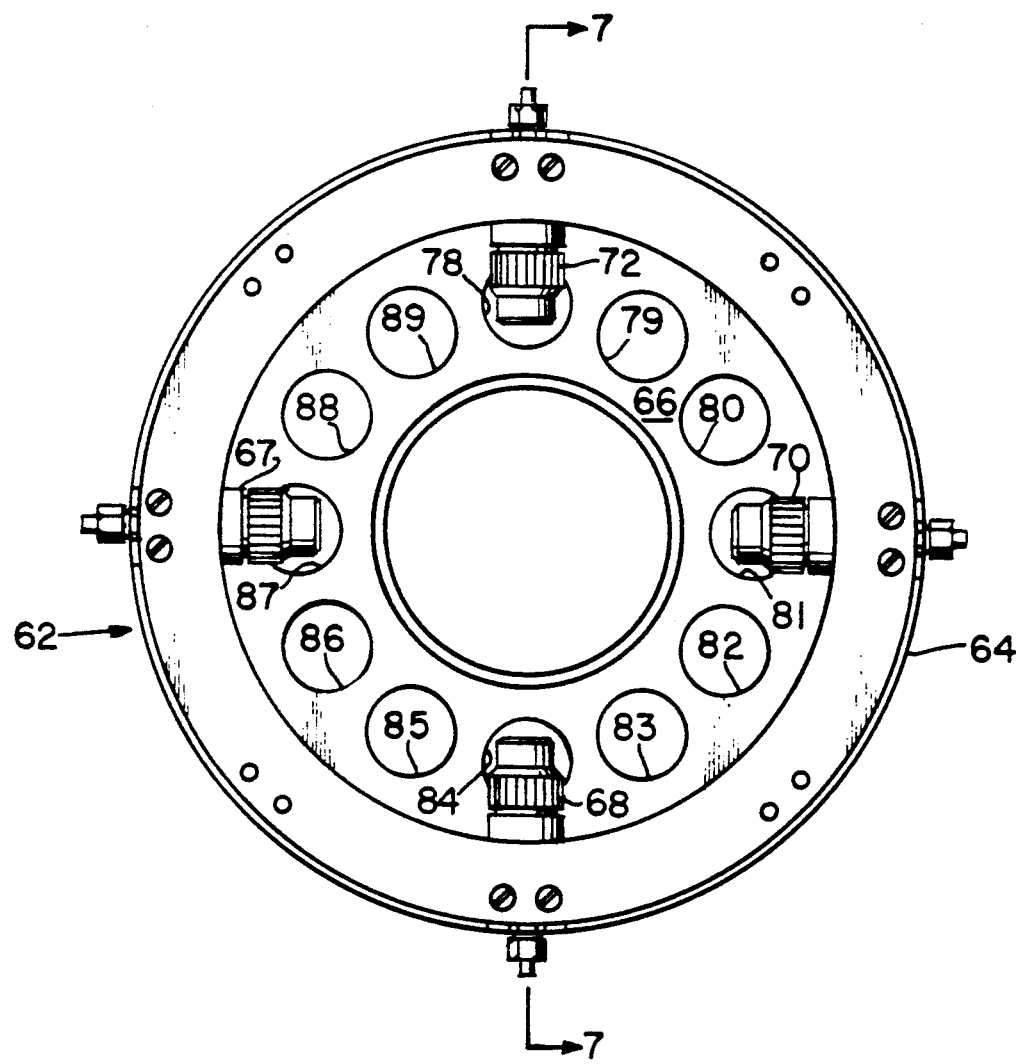
FIG. 6 is an elevational view of the liquid nozzle assembly showing the relationship between the liquid nozzle and the airstream nozzle in the aerosol nozzle assembly of FIG. 1.

It will be further noted from FIG. 6 that disc 66 has a plurality of openings identified in the drawings with the consecutive numerals 78-89. The openings 78-89, which are concentrically arranged about the outer peripheral surface of airstream nozzle 36, allow the controlled flow of a secondary airstream through the disc 66 in the radial space between the primary airstream and the liquid atomizing nozzles 67, 68, 70 and 72, as indicated by arrows 90 in FIG. 8. It is believed that this secondary airflow is entrained by the primary airstream to form a protective sleeve about the outer periphery of the primary airstream, reducing the tendency of the primary airstream to fan out, or to lose its focus. As a consequence, the primary airstream can be directed accurately to a remote target area. It is further believed that this protective sleeve of entrained air protects the primary airstream against the adverse effects of natural wind, and allows the nozzle system 10 to accurately direct the primary airstream, and the gaseous suspension of application media contained therein, to remote targets, even under light wind conditions.

In summary, numerous benefits have been described which result from employing the concepts of the invention. The disclosed nozzle system interjects liquid ULV droplets into the turbulent peripheral boundary of a high velocity airstream, and further atomizes the droplets. A controlled secondary airstream concentrically surrounds and protects the primary airstream, thereby allowing the primary airstream to accurately dispense an application media over a substantial distance. Although the system has special advantages in the dispensing of lightweight ULV droplets, it can be used with either or both solid powered or liquid droplet application medias.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An aerosol nozzle assembly for transporting a gaseous suspension of an application media in an airstream, comprising:
   a) a base;
   b) an airstream nozzle supported relative to said base;
   c) means for producing and directing a primary airstream of high velocity air into said airstream nozzle, said airstream nozzle having a discharge exit for discharging the primary stream of high velocity air;
   d) a liquid atomizing nozzle assembly positioned in proximity to the airstream nozzle discharge exit for dispensing atomized droplets of a liquid application media into the primary stream of high velocity air, said liquid nozzle assembly including at least one liquid atomizing nozzle, the liquid atomizing nozzle having a discharge orifice located axially downstream of and radially spaced from the airstream nozzle exit, said liquid atomizing nozzle being positioned to introduce atomized liquid droplets of the application media radially inwardly into the primary airstream through the primary airstream's peripheral boundaries; and
   e) means for introducing a controlled secondary airstream about the periphery of the primary airstream in the radial space between the liquid nozzle and the peripheral boundaries of the primary airstream.

2. An aerosol nozzle assembly as recited in claim 1 wherein the liquid nozzle assembly includes a plurality of said liquid atomizing nozzles located axially downstream of and radially spaced from the airstream nozzle exit for introducing the atomized liquid droplets of the application media radially inwardly into the primary airstream through the primary airstream's peripheral boundaries.

3. An aerosol nozzle assembly as recited in claims 2 wherein said plurality of liquid nozzles are substantially equally spaced about the periphery of the primary airstream.

4. An aerosol nozzle assembly as recited in claim 1 wherein said secondary airstream introducing means includes a plurality of orifices in the liquid atomizing assembly, said orifices being arranged in concentric relationship to the airstream nozzle.

5. An aerosol nozzle assembly as recited in claim 2 wherein said secondary airstream introducing means includes a plurality of orifices in the liquid atomizing assembly, said orifices being arranged in concentric relationship to the airstream nozzle.

6. An aerosol nozzle assembly as recited in claim 1 wherein the at least one liquid atomizing nozzle introduces atomized droplets of the application media radially inwardly into the primary airstream in a direction generally perpendicular to the axis of the primary airstream.

7. An aerosol nozzle assembly as recited in claim 5 wherein the plurality of said liquid atomizing nozzle introduces the atomized droplets of the application media radially inwardly into the primary airstream in a direction generally perpendicular to the axis of the primary airstream.

8. An aerosol nozzle assembly as recited in claim 7 wherein the airstream nozzle is tapered in the direction of the primary airstream flow.

9. An aerosol nozzle assembly as recited in claim 8 wherein the airstream nozzle includes a curved section.

10. An aerosol nozzle assembly as recited in claim 9 wherein airstream nozzle is tapered in the curved sections to reduce the cross-sectional area of the airstream nozzle substantially constantly through the curved section.

11. An aerosol nozzle assembly as recited in claim 10 wherein the airstream nozzle has a substantially constant cross-sectional area in the section immediately upstream of the discharge exit.

12. An aerosol nozzle assembly as recited in claim 2 wherein the plurality of liquid spray nozzles introduce a plurality of different application medias into the primary airstream.

13. An aerosol nozzle assembly as recited in claim 9 wherein the curvature of the airstream nozzle is adjustable.

14. An aerosol nozzle assembly as recited in claim 1 wherein the atomized droplets dispensed by the atomizing nozzle have an average diameter of less than 60 microns.

15. An aerosol nozzle assembly for transporting a gaseous suspension of a solid granular application media in an airstream, comprising:

a) a base;
b) an airstream nozzle supported relative to said base;
c) a centrifugal fan having flat material handling blades for producing and directing a primary stream of high velocity air into said airstream nozzle, said airstream nozzle having a discharge exit for discharging the primary stream of high velocity air;
d) means for introducing a solid granular application media into the primary airstream upstream of the airstream nozzle discharge exit so as to transport the application media in the primary airstream as the primary airstream is discharged from the airstream nozzle, the solid granular application media being introduced into the primary airstream through the centrifugal fan; and
e) means for introducing a controlled secondary airstream about the periphery of the primary airstream whereby the secondary airstream forms a protective sleeve of air concentrically about the primary airstream.

* * * * *

UNITED STATES PATENT AND TRADEMARK OFFICE
CERTIFICATE OF CORRECTION

PATENT NO. : 5,269,461
DATED : December 14, 1993
INVENTOR(S) : James F. Davis

It is certified that error appears in the above-indentified patent and that said Letters Patent is hereby corrected as shown below:

Column 8:
Claim 7, line 2, delete "nozzle", and insert therefor --nozzles--.
Column 9:
Claim 10, lines 2-3, delete "sections", and insert therefor --section--.
Column 10:
Claim 15, line 12, after "introducing", delete "a", and insert therefor --the--.

Signed and Sealed this

Nineteenth Day of July, 1994

Attest:

BRUCE LEHMAN

Attesting Officer     Commissioner of Patents and Trademarks